UNITED STATES PATENT OFFICE.

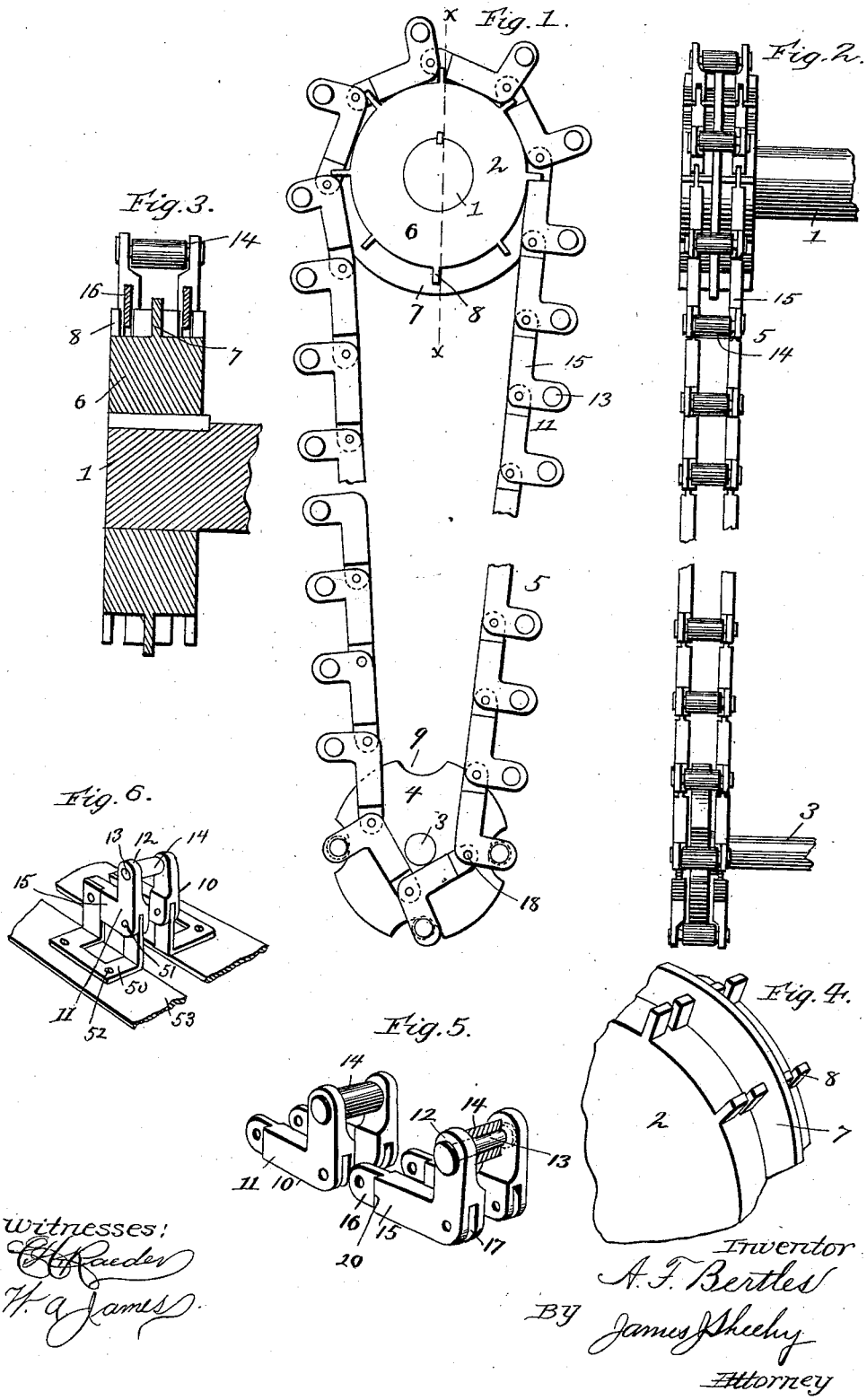

ANDREW F. BERTLES, OF DOYLESTOWN, PENNSYLVANIA.

GEARING.

SPECIFICATION forming part of Letters Patent No. 602,298, dated April 12, 1898.

Application filed April 30, 1896. Serial No. 589,724. (No model.)

*To all whom it may concern:*

Be it known that I, ANDREW F. BERTLES, a citizen of the United States, residing at Doylestown, in the county of Bucks and State of Pennsylvania, have invented certain new and useful Improvements in Chain-Gearing; and I do declare the following to be a full, clear, and exact description of the invention, such as will enable others skilled in the art to which it appertains to make and use the same.

My invention relates to improvements in that class of gearing in which motion is transmitted from one wheel to another through the medium of a sprocket-chain and which are designed with a view of producing easy running of the chain; and it consists in the peculiar construction, novel combination, and adaptation of parts hereinafter described, and particularly pointed out in the claims appended.

In the accompanying drawings, Figure 1 is a side elevation of my improved gearing. Fig. 2 is an elevation taken at right angles to Fig. 1. Fig. 3 is an enlarged transverse section taken in the plane indicated by the line *x x* of Fig. 1. Fig. 4 is a detail perspective view of a portion of the drive-wheel. Fig. 5 comprises perspective views of two disconnected links of the sprocket-chain, one of said links being shown partly in section; and Fig. 6 is a detail view of a modification.

In the said drawings similar numerals designate corresponding parts in all of the views, referring to which—

1 indicates a drive-shaft.

2 indicates a wheel, feathered or otherwise, fixed on the shaft 1 so as to turn therewith.

3 indicates a driven shaft. 4 indicates a wheel fixed on said shaft 3, and 5 indicates a chain through the medium of which motion is transmitted from the wheel 2 to the wheel 4.

The wheel 2, as better shown in Figs. 3 and 4, is provided in the middle of the periphery of its body 6 with a flange 7, which is designed to prevent a lateral displacement of the chain, and it is also provided on the periphery of said body and on opposite sides of the flange 7 with teeth 8, the purpose of which is to engage the links of the chain 5 and transmit motion thereto, as will be presently described.

The wheel 4 is of the same or approximately the same diameter as the body 6 of the wheel 2, and it is provided in its periphery with four (more or less) notches 9, the purpose of which is to seat certain portions of the chain 5, as will be hereinafter pointed out.

The chain 5 is better shown in Figs. 1 and 5, and it comprises the links 10, which are connected together, so as to form an endless chain. Each link 10 comprises the parallel members 11, which are of right-angle or approximately right-angle form and have the outwardly-directed arms 12, the transverse bolt 13, which connects the arms 12 of the members 11, adjacent to the outer ends of said arms, and also serves to hold the members 11 apart, and the antifriction-roller 14, which is loosely mounted on the bolt 13, as illustrated. The links 10 may be flexibly connected together, so as to form an endless chain, in any suitable manner. I prefer, however, to provide the inner arms 15 of the link members 11 with reduced and apertured portions 16 at their rear ends, and also provide kerfs 17 in said members at the apex of their angles to receive the reduced portions 16 and flexibly connect said links by means of the pintles 18, which take through the walls of the kerfs 17 and through the apertured reduced portions 16, as shown in Fig. 1.

The chain 5 is mounted on the wheels 2 and 4 so that the parallel members of the links will take around the periphery of the wheel 2 on opposite sides of the flange 7 and around the wheel 4 on opposite sides of the same, and the links 10 are of such a length that the shoulders 20, formed by the reduced portions 16, will be engaged by the teeth 8 of wheel 2, while the antifriction-rollers 14 are arranged such a distance apart that they will take into the seats 9 of the wheel 4 as the chain passes around said wheel, as shown in Fig. 1. In virtue of this construction it will be perceived that when the shaft 1 and wheel 2 are rotated motion will be transmitted from said wheel 2 to the chain 5 by the teeth 8 engaging the links 10, as before described, and motion will be transmitted from said chain 5 to the wheel 4 by the rollers 14 taking into the notches 9 of said wheel 4, and consequently the chain will run very easily, as is desirable.

The rollers 14 of my improved sprocket-chain serve to reduce the friction and consequently the wear of the parts, and they are therefore desirable. They are not, however, essential, as the link members might be connected by bolts or bars 13 alone.

In Fig. 6 of the drawings I have shown a modified construction of endless chain or belt embodying my invention. In this construction the links 10 are preferably of the same construction as in Figs. 1 and 6—that is to say, they respectively comprise the parallel members 11, which are of right-angle form in cross-section and have the outwardly-directed arms 12 and the inner arms 15, the transverse bolt 13, which connects the arms 12 of the members 11, and the antifriction-roller 14, which is loosely mounted on the bolt 13, as shown. The inner arms 15 of the link members are connected to the outwardly-extending arms of angle-plates 50 by rivets 51 or other suitable means, and the inner arms of said plates 50 are connected by rivets 52 or other suitable means to parallel belts 53, of leather or other suitable material, which in this construction form the flexible connection between the several links 10. This construction operates in substantially the same manner as that shown in Figs. 1 and 5, the motion being transmitted by the drive-wheel to the belts 53, while motion is transmitted from the belt to the wheel to be driven by the antifriction-rollers 14, resting in the notches in said wheel to be driven.

It is obvious that when the belt shown in Fig. 6 is employed the teeth 8 on the wheel 6 may be dispensed with, friction being depended upon to enable the wheel to drive the belt.

With all of its advantages it will be observed that my gearing is simple and light and that it embodies no complicated or delicate parts that are likely to get out of order after short use. Therefore it will be appreciated that the gearing may be used to advantage upon bicycles and other light machines.

Having described my invention, what I claim is—

1. In a gearing, the combination of the drive-wheel having the flange in the middle of its periphery and the pairs of teeth on opposite sides of the said flange, a wheel to be driven having seats in its periphery, and a sprocket-chain taking around and connecting the said wheels and having links respectively comprising the parallel members of right-angle form having the inner arms, the outwardly-directed arms and the transverse bolt connecting the outwardly-directed arms and also having the reduced and apertured portions at the outer ends of the inner arms and the kerfed and apertured portion at the inner ends of the inner arms and pintles flexibly connecting the reduced portions of one link in the kerfs of the next link throughout the chain, substantially as specified.

2. In a gearing, the combination of the drive-wheel having the flange in the middle of its periphery and also having peripheral teeth on opposite sides of the flange, a wheel to be driven having seats in its periphery, and the sprocket-chain taking around and connecting the said wheels and having flexibly-connected links respectively comprising the parallel members of right-angle form having the inner arms adapted to be engaged at their rear ends by the peripheral teeth of the drive-wheel and the arms extending outwardly from the forward ends of the inner arms and the transverse bolt connecting the outwardly-directed arms, substantially as and for the purpose set forth.

In testimony whereof I affix my signature in presence of two witnesses.

ANDREW F. BERTLES.

Witnesses:
JEROME FACKENTHALL,
CHAS. H. HEIST.